(12) United States Patent
Lin

(10) Patent No.: US 7,929,095 B2
(45) Date of Patent: Apr. 19, 2011

(54) LIQUID CRYSTAL DISPLAY PANEL

(75) Inventor: Wen-Ting Lin, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 180 days.

(21) Appl. No.: 12/204,817

(22) Filed: Sep. 5, 2008

(65) Prior Publication Data
US 2009/0109390 A1    Apr. 30, 2009

(30) Foreign Application Priority Data

Oct. 24, 2007    (TW) ................................ 96139840 A

(51) Int. Cl.
*G02F 1/1343*    (2006.01)
(52) U.S. Cl. ........................................ 349/139; 349/142
(58) Field of Classification Search .................. 349/139, 349/142
See application file for complete search history.

(56) References Cited

U.S. PATENT DOCUMENTS

| | | | | |
|---|---|---|---|---|
| 5,777,700 | A * | 7/1998 | Kaneko et al. .................. | 349/39 |
| 5,781,262 | A * | 7/1998 | Suzuki et al. .................. | 349/128 |
| 6,046,790 | A * | 4/2000 | Hara et al. ..................... | 349/172 |
| 6,066,860 | A * | 5/2000 | Katayama et al. ............. | 257/71 |
| 7,061,553 | B2 * | 6/2006 | Taguchi et al. ................. | 349/39 |
| 7,742,114 | B2 * | 6/2010 | Moriwaki ....................... | 349/39 |
| 7,768,584 | B2 * | 8/2010 | Yagi et al. ....................... | 349/39 |
| 2003/0133054 | A1 * | 7/2003 | Taguchi et al. ................. | 349/38 |
| 2004/0114059 | A1 * | 6/2004 | Lee et al. ........................ | 349/39 |
| 2006/0187370 | A1 * | 8/2006 | Hoshino ........................ | 349/38 |
| 2006/0220033 | A1 * | 10/2006 | Yamasaki ....................... | 257/79 |
| 2006/0273316 | A1 * | 12/2006 | Yang et al. ..................... | 257/59 |
| 2006/0286698 | A1 * | 12/2006 | Kurashina ...................... | 438/29 |
| 2008/0002076 | A1 * | 1/2008 | Yagi et al. ....................... | 349/39 |
| 2008/0068359 | A1 * | 3/2008 | Yoshida et al. ............... | 345/204 |
| 2008/0079001 | A1 * | 4/2008 | Umezaki et al. ................ | 257/59 |
| 2009/0065778 | A1 * | 3/2009 | Tsubata et al. .................. | 257/59 |
| 2009/0224245 | A1 * | 9/2009 | Umezaki ........................ | 257/59 |

OTHER PUBLICATIONS

Authored by Soh, et al., article titled "New pixel structure with kickback voltage free AMLCD", adopted from SID 06 Digest, pp. 241-243.

* cited by examiner

*Primary Examiner* — K. Cyrus Kianni
(74) *Attorney, Agent, or Firm* — Jianq Chyun IP Office

(57) ABSTRACT

A liquid crystal display (LCD) panel including an opposite substrate, an active device array substrate, and conductive members is provided. The opposite substrate has transparent conductive blocks. The conductive members are disposed between the opposite substrate and the active device array substrate. The active device array substrate includes scan lines, data lines, common lines, first active devices, pixel electrodes, second active devices, and storage electrodes. Each first active device is electrically connected to the corresponding data line and scan line, and each pixel electrode is electrically connected to one of the first active devices. Each second active device is electrically connected to the corresponding scan line and common line, and each storage electrode is electrically connected to one of the second active devices. Each conductive member is electrically connected to the corresponding transparent conductive block and storage electrode. Therefore, the image flicker of the LCD panel is alleviated.

13 Claims, 4 Drawing Sheets

LIQUID CRYSTAL DISPLAY PANEL

CROSS-REFERENCE TO RELATED APPLICATION

This application claims the priority benefit of Taiwan application serial no. 96139840, filed on Oct. 24, 2007. The entirety of the above-mentioned patent application is hereby incorporated by reference herein and made a part of specification.

BACKGROUND OF THE INVENTION

1. Field of the Invention

The present invention relates to a display panel. More particularly, the present invention relates to an LCD panel.

2. Description of Related Art

In response to the increasing demand of displays, the maker put efforts in the development of the display. Among the displays, the cathode ray tube (CRT) has occupied the display market for many years, due to its high display quality and mature technology. However, the rising "environmental protection" awareness is against its power consumption and radiation disadvantage, and the limited flattening capability has limited the advance of CRTs. Therefore, the thin film transistor liquid crystal display (TFT-LCD), having superior properties such as high image quality, good space utilization, low power consumption, and no radiation, has become the mainstream display product of the market.

The TFT-LCD module mainly includes an LCD panel and a backlight module. The LCD panel is usually constituted by a thin film transistor array substrate, a color filter substrate, and a liquid crystal layer disposed between the two substrates. The backlight module is used to provide a surface light source for the LCD panel, such that the LCD module can achieve the display effect.

During operation, when the TFT is turned off by a gate-off voltage provided by the scan lines, the voltage on the pixel electrodes will suddenly drop because of the feed-through voltage. Further, the value of the feed-through voltage is related to parasitic capacitances between the gate, drain and the scan lines, data lines of the TFT. Generally speaking, for common displays, if the feed-through voltage is smaller, image flicker or image sticking may be less likely to occur. In other words, the display quality will be better.

SUMMARY OF THE INVENTION

The present invention is directed to an LCD panel, which can alleviate the image flicker.

An LCD panel including an opposite substrate, an active device array substrate, and a plurality of conductive members is provided. The opposite substrate has a plurality of transparent conductive blocks electrically insulated from each other. The active device array substrate includes a substrate, a plurality of scan lines, a plurality of data lines, a plurality of common lines, a plurality of first active devices, a plurality of pixel electrodes, a plurality of second active devices, and a plurality of storage electrodes. The scan lines, data lines, common lines, first active devices, pixel electrodes, second active devices, and storage electrodes are disposed on the substrate. Each first active device is electrically connected to the corresponding data line and scan line, and each pixel electrode is electrically connected to one of the first active devices. Each second active device is electrically connected to the corresponding scan line and common line, and each storage electrode is electrically connected to one of the second active devices. The conductive members are disposed between the active device array substrate and the opposite substrate. Each conductive member is electrically connected to one of the transparent conductive blocks and one of the storage electrodes.

In an embodiment of the present invention, each of the conductive members includes a body and a transparent conductive layer covered on the body.

In an embodiment of the present invention, the body is disposed on the opposite substrate, and the transparent conductive layer and the transparent conductive blocks are formed in a same layer.

In an embodiment of the present invention, the opposite substrate has a color filter layer, and the body is a part of the color filter layer. The body at least includes one of a first color layer, a second color layer, and a third color layer.

In an embodiment of the present invention, the body is a photoresist spacer.

In an embodiment of the present invention, the body is disposed on the active device array substrate, the transparent conductive layer and the pixel electrodes are formed in a same layer, and the transparent conductive layer is electrically insulated from the pixel electrodes.

In an embodiment of the present invention, the common lines and the scan lines are formed in a same layer.

In an embodiment of the present invention, the common lines and the data lines are formed in a same layer.

In an embodiment of the present invention, the storage electrodes and the data lines are formed in a same layer.

In an embodiment of the present invention, feed-through voltages caused by the first active devices and the second active devices are the same.

In an embodiment of the present invention, the storage electrodes are parallel to the scan lines.

In an embodiment of the present invention, the storage electrodes are parallel to the data lines.

In an embodiment of the present invention, the LCD panel further includes a liquid crystal layer disposed between the transparent conductive blocks of the opposite substrate and the active device array substrate.

In view of the above, according to the present invention, separate transparent conductive blocks are disposed on the opposite substrate, and a common voltage transmitted by the common lines is conducted to the transparent conductive blocks through the second active devices and the conductive members. Further, the feed-through voltage generated by the first active devices is substantially the same as that generated by the second active devices. When the first and second active-devices are turned off, the voltage difference between the transparent conductive blocks and the pixel electrodes may not be changed significantly. Therefore, the image flicker or image sticking can be alleviated, and the display quality is improved.

In order to make the aforementioned and other objectives, features, and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
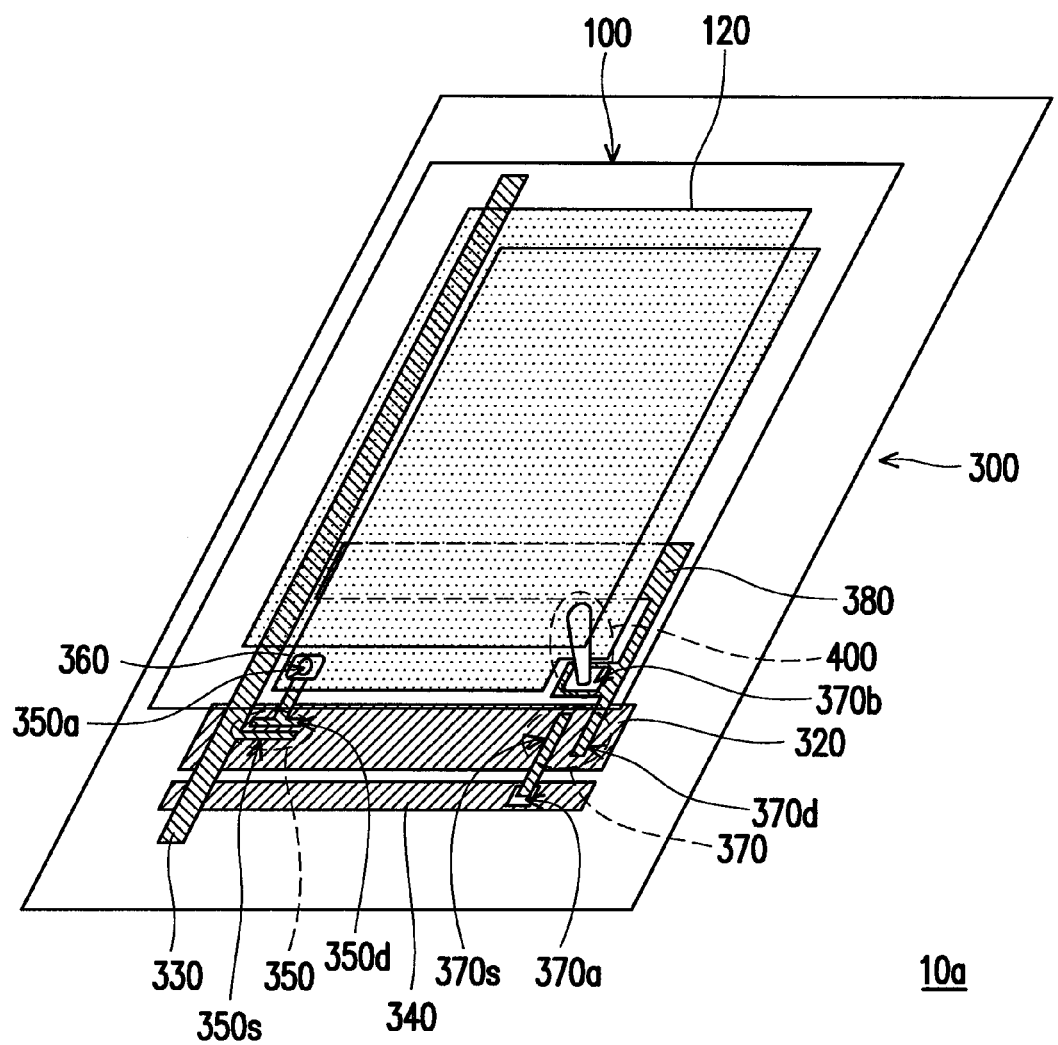
FIG. 1 is a structural view of an LCD panel according to an embodiment of the present invention.
Figure 2:
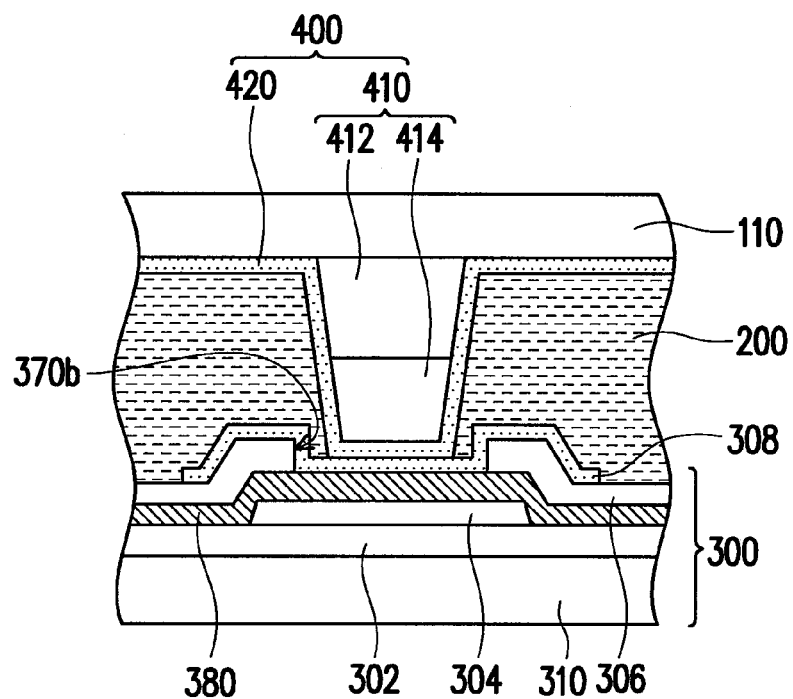
FIG. 2 is a cross-sectional view of a conductive member in FIG. 1.

FIG. 1 is a structural view of an LCD panel according to an embodiment of the present invention. FIG. 2 is a cross-sectional view of a conductive member in FIG. 1. Referring to FIGS. 1 and 2, for simplifying the description, a single pixel region is illustrated in this embodiment. The LCD panel 10a includes an opposite substrate 100, a liquid crystal layer 200, an active device array substrate 300, and a plurality of conductive members 400. The opposite substrate 100 includes a substrate 110 and a plurality of transparent conductive blocks 120 disposed on the substrate 110. The transparent conductive blocks 120 are electrically insulated from each other. The liquid crystal layer 200 and the conductive members 400 are disposed between the transparent conductive blocks 120 of the opposite substrate 100 and the active device array substrate 300.

The active device array substrate 300 includes a substrate 310, a plurality of scan lines 320, a plurality of data lines 330, a plurality of common lines 340, a plurality of first active devices 350, a plurality of pixel electrodes 360, a plurality of second active devices 370, and a plurality of storage electrodes 380. The scan lines 320, data lines 330, common lines 340, first active devices 350, pixel electrodes 360, second active devices 370, and storage electrodes 380 are disposed on the substrate 310. In this embodiment, the second active devices 370 and the first active devices 350 are TFTs having a top gate, or may be TFTs having a bottom gate, low-temperature polysilicon TFTs, or other types of three-terminal switching devices.

Each first active device 350 is electrically connected to the corresponding scan line 320 and data line 330, and each pixel electrode 360 is electrically connected to the corresponding first active device 350. In detail, each first active device 350 includes a drain 350d and a source 350s. The source 350s is electrically connected to the corresponding data line 330. Besides, each first active device 350 has a contact window 350a, and the drain 350d is electrically connected to the corresponding pixel electrode 360 through the contact window 350a. Further, the drain 350d and the source 350s are disposed above the corresponding scan line 320, such that a portion of the scan line 320 is taken as a gate. However, in another embodiment, each first active device 350 may have an independent gate.

Figure 5:
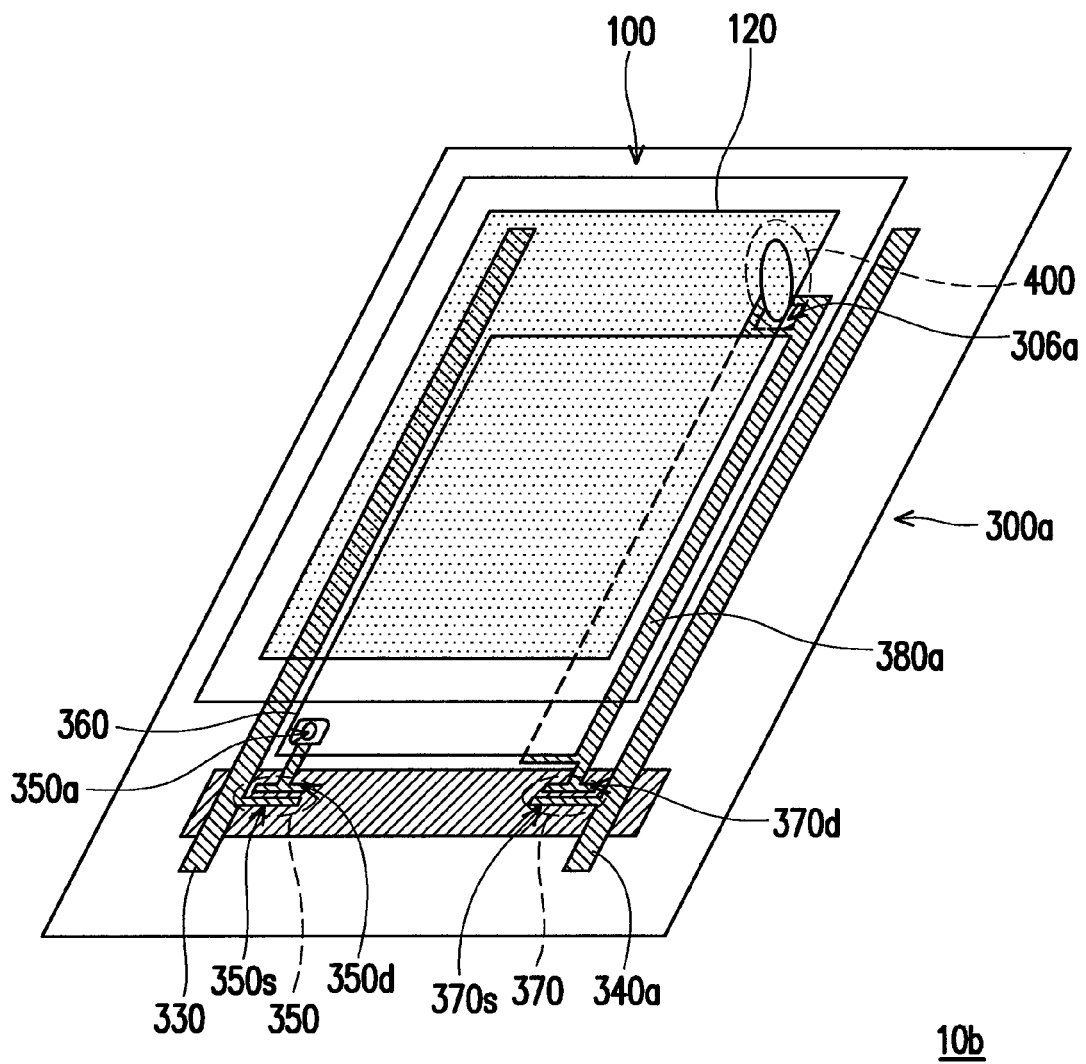
FIG. 5 is a structural view of an LCD panel according to another embodiment of the present invention.

Each second active device 370 is electrically connected to the corresponding scan line 320 and common line 340, and each storage electrode 380 is electrically connected to one of the second active devices 370. In detail, each second active device 370 includes a drain 370d and a source 370s. The drain 370d is electrically connected to the corresponding storage electrode 380, and the storage electrodes 380 and the data lines 330 are formed in a same layer. Besides, in this embodiment, since the common lines 340 and the scan lines 320 are formed in a same layer, each second active device 370 further has a contact window 370a. The source 370s is electrically connected to the corresponding common line 340 through the contact window 370a. Further, the drain 370d and the source 370s are disposed above the corresponding scan line 320, such that a portion of the scan line 320 serves as a gate. However, in another embodiment, each second active device 370 may have an independent gate. In this embodiment, the storage electrodes 380 are parallel to the scan lines 320, and the storage electrodes 380 may also be substantially parallel to the data lines 330 (as shown in FIG. 5) or in other patterns.

Referring to FIGS. 1 and 2, each conductive member 400 is electrically connected to one of the transparent conductive blocks 120 and one of the storage electrodes 380. In detail, each conductive member 400 includes a body 410 and a transparent conductive layer 420. The body 410 is disposed on the opposite substrate 100, and the transparent conductive layer 420 is covered on the body 410. In this embodiment, the body 410 includes a first color layer 412 and a second color layer 414, which are part of a color filter layer (not shown) of the opposite substrate 100. For example, the first color layer 412 is one of a red color layer, a blue color layer, and a green color layer, and the second color layer 414 is another one of the red color layer, the blue color layer, and the green color layer. However, in order to change the height of the body 410, the body 410 may be formed by stacking three color layers or by one color layer. Further, the transparent conductive layer 420 and the transparent conductive blocks 120 are formed in the same layer.

Further, in order to lower the height of the body 410, the active device array substrate 300 includes a gate insulating layer 302, a semiconductor layer 304, a protective layer 306, and a transparent conductive layer 308. The gate insulating layer 302 and the semiconductor layer 304 are disposed below the contact window 370b, and the transparent conductive layer 308 is electrically connected to the storage electrode 380 exposed by the contact window 370b. Or, the transparent conductive layer 308 may also be disposed in the contact window 370b, and electrically connected to the storage electrode 380. The transparent conductive layer 420 is electrically connected to the storage electrode 380 through the transparent conductive layer 308.

Figure 3:
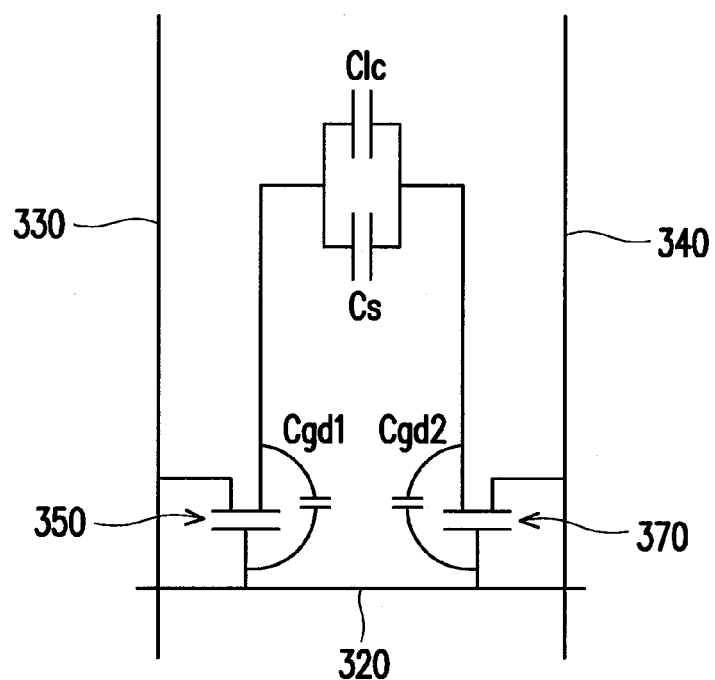
FIG. 3 is an equivalent circuit diagram of an LCD panel according to an embodiment of the present invention.

FIG. 3 is an equivalent circuit diagram of an LCD panel according to an embodiment of the present invention. Referring to FIGS. 1 and 3, Cgd1 represents a parasitic capacitance between each scan line 320 and the drain 350d of the corresponding first active device 350. Cgd2 represents a parasitic capacitance between the scan line 320 and the drain 370d of the corresponding second active device 370. Cs represents a storage capacitance between the corresponding storage electrode 380 and pixel electrode 360. Clc represents a liquid crystal capacitor between the corresponding pixel electrode 360 and transparent conductive block 120.

The opposite substrate 100 is divided into a plurality of separate transparent conductive blocks 120. A common voltage transmitted by the common lines 340 is conducted to the transparent conductive blocks 120 through the second active devices 370, the storage electrodes 380, and the conductive members 400. Besides, when the overlapping area between the drain 370d of each second active device 370 and the corresponding scan line 320 is similar to that between the drain 350d of each first active device 350 and the corresponding scan line 320. Cgd1 is approximate to Cgd2, such that the feed-through voltage generated by the first active devices 350 is substantially the same as that generated by the second active devices 370. In other words, when the first active devices 350 and the second active devices 370 are turned off, the voltage drop of the transparent conductive blocks 120 of the opposite substrate 100 is substantially the same as that of the pixel electrodes 360 of the active device array substrate 300; therefore, the voltage difference between the pixel electrodes 360 and the transparent conductive blocks 120 may not change greatly, thus alleviating the image flicker or image sticking.

Figure 4A:
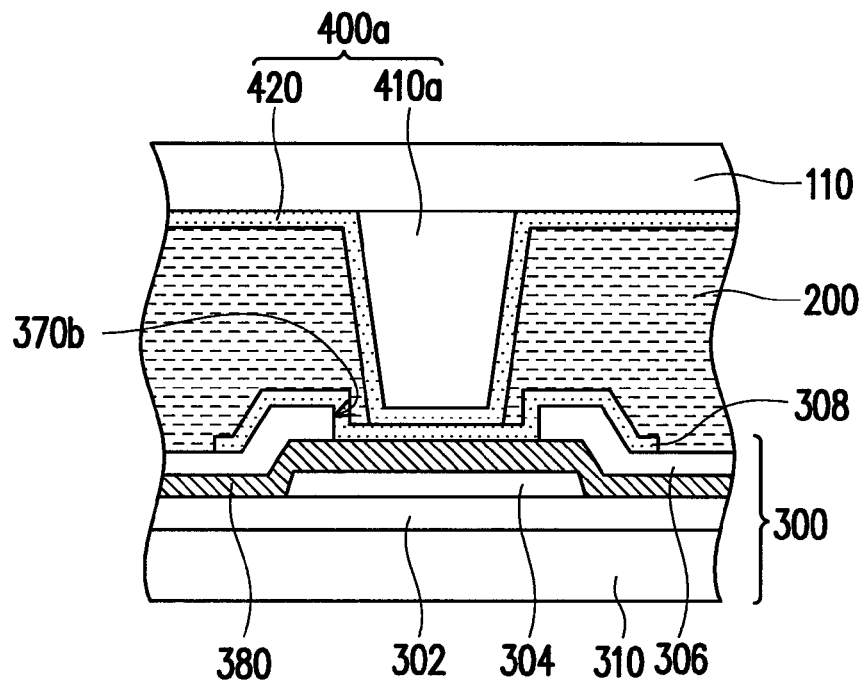
FIGS. 4A and 4B are cross-sectional views of a conductive member of another type.
Figure 4B:
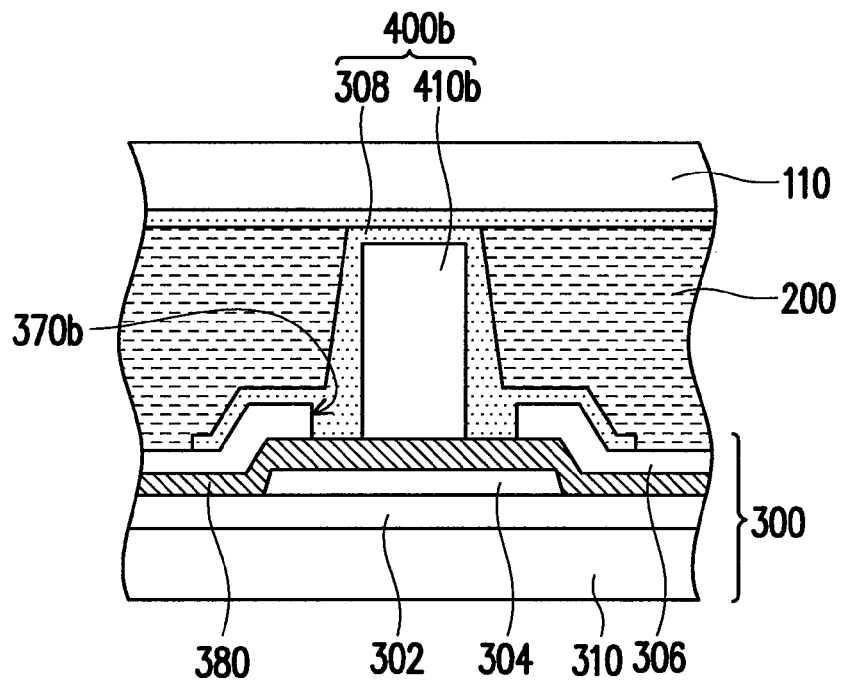

FIGS. 4A and 4B are cross-sectional views of the conductive member of another type. First referring to FIG. 4A, the conductive member 400a in FIG. 4 is similar to the conductive member 400 in FIG. 2. The body 410a of the conductive member 400a is disposed on the opposite substrate 100, and the transparent conductive layer 420 is covered on the body 410a. However, the body 410a is a photoresist spacer.

Referring to FIG. 4B, the body 410b of the conductive member 400b is disposed on the active device array substrate 300, and the transparent conductive layer 308 is covered on the body 410b. Moreover, the body 410b is a photoresist spacer. The transparent conductive layer 308 and the pixel electrode 360 are formed in a same layer, and are electrically insulated from each other.

FIG. 5 is a structural view of an LCD panel according to another embodiment of the present invention. Referring to FIG. 5, the LCD panel 10b in FIG. 5 is similar to the LCD panel 10a in FIG. 1, and the difference is described as follows. In the LCD panel 10b, the common lines 340a and the data lines 330 are formed in a same layer, and the storage electrodes 380a are substantially parallel to the data lines 330. Moreover, the active device array substrate 300a has a plurality of contact windows 306a, and the conductive members 400 are electrically connected to the storage electrodes 380a through the contact windows 306a, such that a common voltage transmitted by the common lines 340a is conducted to the transparent conductive blocks 120 of the opposite substrate 100 through the conductive members 400. Further, the above conductive members 400a, 400b may also be applied to the LCD panel 10b.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An LCD panel, comprising:
    an active device array substrate, comprising:
        a substrate;
        a plurality of scan lines, disposed on the substrate;
        a plurality of data lines, disposed on the substrate;
        a plurality of common lines, disposed on the substrate;
        a plurality of first active devices, disposed on the substrate, wherein each of the first active devices is electrically connected to the corresponding scan line and data line;
        a plurality of pixel electrodes, disposed on the substrate, wherein each of the pixel electrodes is electrically connected to one of the first active devices;
        a plurality of second active devices, disposed on the substrate, wherein each of the second active devices is electrically connected to the corresponding scan line and common line; and
        a plurality of storage electrodes, disposed on the substrate, wherein each of the storage electrodes is electrically connected to one of the second active devices; and
    an opposite substrate, having a plurality of transparent conductive blocks, wherein the transparent conductive blocks are electrically insulated from each other; and
    a plurality of conductive members, disposed between the active device array substrate and the opposite substrate, wherein each of the conductive members is electrically connected to one of the transparent conductive blocks and one of the storage electrodes.

2. The LCD panel according to claim 1, wherein each of the conductive members comprises a body and a transparent conductive layer covered on the body.

3. The LCD panel according to claim 2, wherein the body is disposed on the opposite substrate, and the transparent conductive layer and the transparent conductive blocks are formed in a same layer.

4. The LCD panel according to claim 3, wherein the opposite substrate has a color filter layer, and the body is a part of the color filter layer, the body at least comprising one of a first color layer, a second color layer, and a third color layer.

5. The LCD panel according to claim 3, wherein the body is a photoresist spacer.

6. The LCD panel according to claim 2, wherein the body is disposed on the active device array substrate, the transparent conductive layer and the pixel electrodes are formed in a same layer, and the transparent conductive layer is electrically insulated from the pixel electrodes.

7. The LCD panel according to claim 1, wherein the common lines and the scan lines are formed in a same layer.

8. The LCD panel according to claim 1, wherein the common lines and the data lines are formed in a same layer.

9. The LCD panel according to claim 1, wherein the storage electrodes and the data lines are formed in a same layer.

10. The LCD panel according to claim 1, wherein feedthrough voltages caused by the first active devices and the second active devices are the same.

11. The LCD panel according to claim 1, wherein the storage electrodes are parallel to the scan lines.

12. The LCD panel according to claim 1, wherein the storage electrodes are parallel to the data lines.

13. The LCD panel according to claim 1, further comprising a liquid crystal layer disposed between the transparent conductive blocks of the opposite substrate and the active device array substrate.

* * * * *